(12) United States Patent
Ji

(10) Patent No.: US 12,177,719 B2
(45) Date of Patent: Dec. 24, 2024

(54) BUFFER STATUS REPORT TRANSMISSION METHOD, TERMINAL AND SCHEDULING DEVICE

(71) Applicant: VIVO MOBILE COMMUNICATION CO., LTD., Dongguan (CN)

(72) Inventor: Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 67 days.

(21) Appl. No.: 17/213,307

(22) Filed: Mar. 26, 2021

(65) Prior Publication Data

US 2021/0219169 A1 Jul. 15, 2021

Related U.S. Application Data

(63) Continuation of application No. PCT/CN2019/102210, filed on Aug. 23, 2019.

(30) Foreign Application Priority Data

Sep. 27, 2018 (CN) .......................... 201811133798.1

(51) Int. Cl.
*H04W 28/02* (2009.01)
*H04L 1/18* (2023.01)
(Continued)

(52) U.S. Cl.
CPC ....... *H04W 28/0278* (2013.01); *H04L 1/1819* (2013.01); *H04W 72/046* (2013.01); *H04W 72/1263* (2013.01); *H04W 92/18* (2013.01)

(58) Field of Classification Search
CPC ........... H04W 28/0278; H04W 28/044; H04W 28/0205; H04W 28/1215; H04W 28/0284;
(Continued)

(56) References Cited

U.S. PATENT DOCUMENTS

2017/0353819 A1* 12/2017 Yin .......................... H04W 4/70
2018/0042037 A1* 2/2018 Jin ..................... H04W 72/0406
(Continued)

FOREIGN PATENT DOCUMENTS

CN 106797633 B * 4/2015 ............ H04W 72/04
CN 105163346 A 12/2015
(Continued)

OTHER PUBLICATIONS

International Search Report issued in corresponding International Application No. PCT/CN2019/102210, mailed Nov. 7, 2019, 6 pages.
(Continued)

*Primary Examiner* — Phong La
(74) *Attorney, Agent, or Firm* — IPX PLLC

(57) ABSTRACT

The present disclosure provides a buffer status report transmission method, a terminal and a scheduling device. The method includes: transmitting a buffer status report to a scheduling device, where the buffer status report is used to indicate at least one piece of target information as follows: a data size of and a corresponding channel for sidelink data to be transmitted; a transmission type of sidelink data to be transmitted; a transmission object of sidelink data to be transmitted; beam information of sidelink data to be transmitted; and a buffer type of sidelink data to be transmitted.

15 Claims, 4 Drawing Sheets

(51) Int. Cl.
*H04L 1/1812* (2023.01)
*H04W 72/04* (2023.01)
*H04W 72/044* (2023.01)
*H04W 72/12* (2023.01)
*H04W 72/1263* (2023.01)
*H04W 92/18* (2009.01)

(58) Field of Classification Search
CPC . H04W 28/0289; H04W 28/02; H04W 28/08; H04W 28/06; H04W 72/046; H04W 72/0453; H04W 72/1263; H04W 72/12; H04W 72/1205; H04W 72/1278; H04L 1/1819; H04L 1/1812; H04L 1/1822
See application file for complete search history.

(56) References Cited

U.S. PATENT DOCUMENTS

| | | | | |
|---|---|---|---|---|
| 2018/0367255 | A1* | 12/2018 | Jeon | H04L 1/0028 |
| 2019/0044667 | A1* | 2/2019 | Guo | H04L 1/1816 |
| 2019/0174346 | A1* | 6/2019 | Murray | H04W 24/10 |
| 2019/0260623 | A1* | 8/2019 | Li | H04L 27/2627 |
| 2019/0274121 | A1* | 9/2019 | Wu | H04W 48/10 |
| 2020/0137754 | A1* | 4/2020 | Kim | H04W 28/0278 |
| 2021/0168647 | A1* | 6/2021 | Li | H04W 28/0263 |
| 2021/0219169 | A1* | 7/2021 | Ji | H04W 72/1263 |
| 2021/0297199 | A1* | 9/2021 | Miao | H04L 1/1896 |
| 2021/0385694 | A1* | 12/2021 | Freda | H04W 74/0816 |
| 2022/0232549 | A1* | 7/2022 | Yeo | H04L 1/0027 |

FOREIGN PATENT DOCUMENTS

| | | | | |
|---|---|---|---|---|
| CN | 106792430 | A | 5/2017 | |
| CN | 107211432 | A | 9/2017 | |
| CN | 107347219 | A | 11/2017 | |
| CN | 106792430 | B * | 11/2018 | H04W 4/70 |
| WO | WO 2017004341 | * | 1/2017 | |
| WO | WO-2019153234 | A1 * | 8/2019 | H04W 28/0268 |

OTHER PUBLICATIONS

Samsung, "R2-154064, Sidelink BSR for Unicast", 3GPP TSG RAN WG2 Meeting #91bis, Oct. 9, 2015.
Qualcomm Incorporated, "R1-1809452, Enhancements of NR Uu to control LTE sidelink", 3GPP TSG-RAN WG1 Meeting #94, Aug. 24, 2018.
Interdigital Inc., "R1-1808599, Resource Allocation for NR V2X", 3GPP RAN WG1 Meeting #94, Aug. 24, 2018.
ZTE Corporation, "R2-1801960, Discussion on mode 3 resource allocation in PC5 CA", 3GPP TSG-RAN WG2 Meeting #101, Mar. 2, 2018.
Samsung, "R1-1808776, Discussion on physical layer structures and procedures for NR V2X", 3GPP TSG RAN WG1 #94, Aug. 24, 2018.
Qualcomm Incorporated, "R1-1809451, Enhancements of LTE Uu and NR Uu to control NR sidelink", 3GPP TSG-RAN WG1 Meeting #94, Aug. 24, 2018.
Interdigital Inc., "R1-1809093, NR Sidelink Support of Unicast, Groupcast and Broadcast", 3GPP TSG RAN WG1 Meeting #94, Aug. 24, 2018.
First Office Action issued in related Chinese Application No. 201811133798.1, mailed Jan. 4, 2021, 10 pages.

* cited by examiner

BUFFER STATUS REPORT TRANSMISSION METHOD, TERMINAL AND SCHEDULING DEVICE

CROSS-REFERENCE OF RELATED APPLICATIONS

This application is a bypass continuation of PCT Application No. PCT/CN2019/102210, filed Aug. 23, 2019, which claims priority to Chinese Patent Application No. 201811133798.1, filed on Thursday, Sep. 27, 2018. Both applications are incorporated herein by reference in their entireties.

TECHNICAL FIELD

The present disclosure relates to the field of communications technologies, and in particular, to a buffer status report transmission method, a terminal, and a scheduling device.

BACKGROUND

The Long Term Evolution (LTE) system has supported the sidelink (sidelink) starting from Release 12, which is used for direct data transmission between User Equipment (UE), without using any network devices.

The UE transmits Sidelink Control Information (SCI) through a Physical Sidelink Control Channel (PSCCH), and schedules transmission of a Physical Sidelink Shared Channel (PSSCH) to transmit data. The transmission is in the form of broadcast, and the receiving end does not feed back to the transmitting end whether reception is successful.

The design of LTE sidelink supports two resource allocation modes: the scheduled resource allocation mode and the autonomous resource selection mode. The scheduled resource allocation mode is controlled by a network side device to allocate a resource for each UE. For the autonomous resource selection mode, UE selects a resource autonomously.

LTE has supported sidelink Carrier Aggregation (CA) starting from Release 15. The CA of LTE sidelink and CA of LTE Uu interfaces (that is, downlink and uplink) are different, and there is no Primary Component Carrier (PCC) or Secondary Component Carrier (SCC). UE in the autonomous resource selection mode performs resource sensing and resource reservation independently on each CC.

The 5th generation mobile communication technology (5G NR) system can be used in an operating frequency band above 6 GHz that LTE does not support, and NR supports higher operating bandwidth and multi-beam transmission. However, the current NR system only supports an interface between a base station and a terminal, and does not yet support a sidelink interface between terminals for direct communication.

SUMMARY

Embodiments of the present disclosure provide a buffer status report transmission method, a terminal, and a scheduling device to implement that the terminal reports information related to sidelink data transmission to the scheduling device, so that the scheduling device can complete configuration for sidelink data transmission for the terminal in an effective way.

To realize the foregoing objective, the present disclosure is implemented as follows:

According to a first aspect, an embodiment of the present disclosure provides a buffer status report transmission method, which is applied to a terminal and includes:

transmitting a buffer status report to a scheduling device, where the buffer status report is used to indicate at least one piece of target information as follows:

a data size of and a corresponding channel for sidelink data to be transmitted:

a transmission type of sidelink data to be transmitted:

a transmission object of sidelink data to be transmitted:

beam information of sidelink data to be transmitted;

and a buffer type of sidelink data to be transmitted:

According to a second aspect, an embodiment of the present disclosure further provides a buffer status report transmission method, which is applied to a scheduling device and includes:

receiving a buffer status report sent by a terminal, where the buffer status report is used to indicate at least one piece of target information as follows:

a data size of and a corresponding channel for sidelink data to be transmitted:

a transmission type of sidelink data to be transmitted:

a transmission object of sidelink data to be transmitted:

beam information of sidelink data to be transmitted:

and a buffer type of sidelink data to be transmitted:

According to a third aspect, an embodiment of the present disclosure further provides a terminal, including:

a first transmitting module, configured to transmit a buffer status report to a scheduling device, where the buffer status report is used to indicate at least one piece of target information as follows:

a data size of and a corresponding channel for sidelink data to be transmitted:

a transmission type of sidelink data to be transmitted:

a transmission object of sidelink data to be transmitted:

beam information of sidelink data to be transmitted;

and a buffer type of sidelink data to be transmitted:

According to a fourth aspect, an embodiment of the present disclosure further provides a scheduling device, including:

a first receiving module, configured to receive a buffer status report sent by a terminal, where the buffer status report is used to indicate at least one piece of target information as follows:

a data size of and a corresponding channel for sidelink data to be transmitted;

a transmission type of sidelink data to be transmitted:

a transmission object of sidelink data to be transmitted:

beam information of sidelink data to be transmitted;

and a buffer type of sidelink data to be transmitted:

According to a fifth aspect, an embodiment of the present disclosure further provides a terminal, including: a processor, a memory, and a computer program stored in the memory and executable on the processor, where when the computer program is executed by the processor, the step of the foregoing buffer status report transmission method applied to the terminal is performed.

According to a sixth aspect, an embodiment of the present disclosure further provides a scheduling device, including a processor, a memory, and a computer program stored in the memory and executable on the processor, where when the computer program is executed by the processor, the step of the foregoing buffer status report transmission method applied to the scheduling device is implemented.

According to a seventh aspect, an embodiment of the present disclosure further provides a computer-readable storage medium, where the computer-readable storage medium stores a computer program, and when the computer program is executed by a processor, the step of the foregoing buffer status report transmission method applied to a terminal is implemented.

According to an eighth aspect, an embodiment of the present disclosure further provides a computer-readable storage medium, where the computer-readable storage medium stores a computer program, and when the computer program is executed by a processor, the step of the foregoing buffer status report transmission method applied to a scheduling device is implemented.

In this case, in the embodiment of the present disclosure, a terminal can transmit a buffer status report to a scheduling device, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can complete sidelink data transmission configuration for the terminal in a more effective way.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
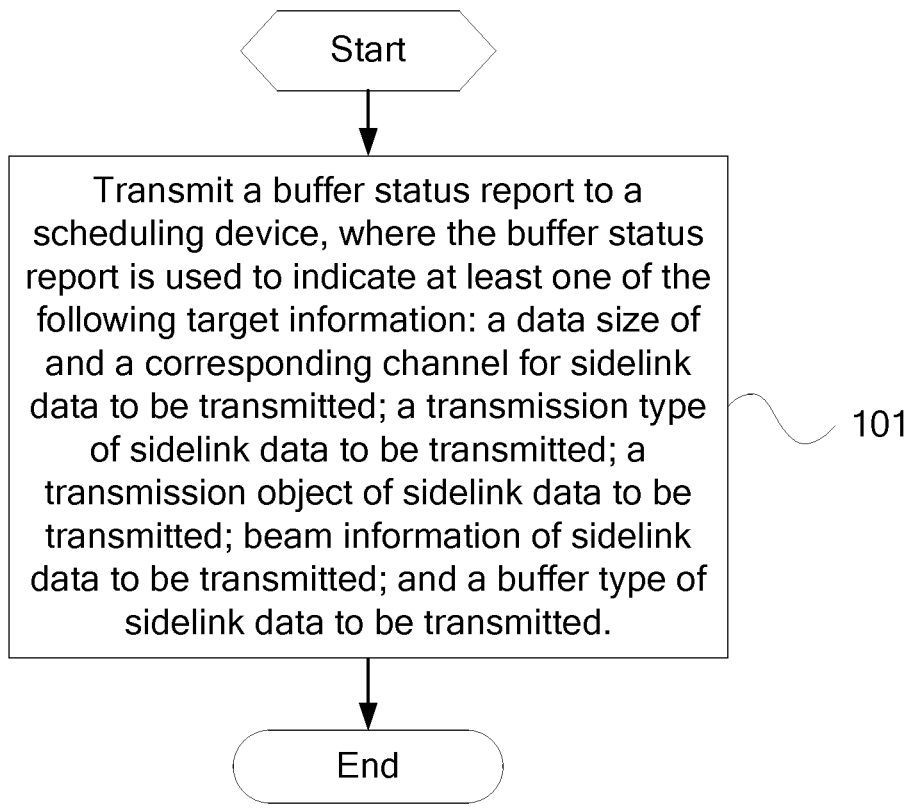
FIG. 1 is a first schematic flowchart of a buffer status report transmission method applied to a terminal according to an embodiment of the present disclosure.

As shown in FIG. 1, a buffer status report transmission method according to an embodiment of the present disclosure, which is applied to a terminal, includes:

Step 101. transmit a buffer status report to a scheduling device, where the buffer status report is used to indicate at least one piece of target information as follows:

a data size of and a corresponding channel for sidelink data to be transmitted:

a transmission type of sidelink data to be transmitted:

a transmission object of sidelink data to be transmitted:

beam information of sidelink data to be transmitted:

and a buffer type of sidelink data to be transmitted:

Through the foregoing steps, a terminal can transmit a buffer status report to a scheduling device, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can achieve configuration of sidelink data transmission for the terminal in a more effective way.

Optionally, step 101 includes:

transmitting the buffer status report to the scheduling device in the case that there is sidelink data to be transmitted.

In this case, the terminal will transmit the buffer status report to the scheduling device in a timely manner in the case that there is sidelink data to be transmitted to ensure timely sidelink data transmission.

It should be noted that in this embodiment, a corresponding channel for the sidelink data to be transmitted (such as a logical channel) may be a single channel or multiple channels (that is, a transmission type of the sidelink data to be transmitted in a channel group is specifically: unicast transmission, groupcast (multicast) transmission and broadcast transmission: a transmission object of the sidelink data to be transmitted, that is, a peer device that performs sidelink data transmission with the terminal, such as user equipment UE: beam information of the sidelink data to be transmitted includes, but is not limited to, beam (sweeping beam, one or more specific beams) identification and beam transmission mode utilized by the terminal to transmit the sidelink data to be transmitted to the transmission object, where the beam identification may be a beam ID, a reference signal/channel identification index, transmission configuration indicator TCI, or the like: a buffer type of the sidelink data to be transmitted will be used to indicate that the sidelink data to be transmitted is buffered in LTE or in NR, so that the scheduling device can correctly schedule transmission for the terminal. The buffer type is specifically: a LTE sidelink or NR sidelink.

The scheduling device herein may be a network device, such as a base station, or UE that can schedule another UE.

The buffer status report indicates the target information directly or indirectly.

The foregoing target information herein is reported by the terminal to the scheduling device through the buffer status report BSR, where the BSR may perform indication directly or indirectly.

In the direct indication mode, the terminal may not report to the scheduling device after setting up the sidelink unicast or groupcast, and directly notifies relevant information in the BSR instead. For example, the buffer status report directly indicates a transmission object of the sidelink data to be transmitted. In the case of unicast transmission, the buffer status report will carry an identity ID of the transmission object, where the identity may be specifically a data link layer ID, a physical layer ID, an application layer ID or an Internet Protocol IP address, or the like: in the case of groupcast transmission, the buffer status report will carry a group ID of the groupcast transmission object. In this case, all terminals of the groupcast transmission object belong to the group ID. Alternatively, the buffer status report carries information about a transmission type, such as broadcast transmission or unicast transmission, to directly indicate the transmission type of the sidelink data to be transmitted.

In the indirect indication mode, the quantity of bits of the information carried by the BSR may be much smaller than that of the information in the direct indication, thus saving overhead of the BSR. Optionally, in this embodiment, indicating the target information indirectly by the buffer status report includes:

indicating the target information based on an association relationship with a hybrid automatic repeat request HARQ entity: or indicating the target information based on an association relationship with a preset identifier: or indicating the target information based on an association relationship with a resource element: or indicating the target information based on an association relationship with a beam; or indicating the target information based on an association relationship with a channel.

In this case, in this embodiment, considering construction of the HARQ entity, the target information will be indicated based on the association relationship with the HARQ entity. For example, one HARQ entity is established for each unicast UE connection, one HARQ entity is established for each groupcast group, and a broadcast correspond to one HARQ entity. In this case, the BSR can report an associated HARQ entity to indicate a corresponding transmission object. It is sure that construction of an entity may be predefined.

Alternatively, in this embodiment, for an established association relationship between a preset identifier and information, the BSR will indicate corresponding target information by carrying a specific preset identifier. For example, the transmission object (unicast UE ID or groupcast group ID) of the sidelink data to be transmitted is associated with one subscript or identification index, and broadcast corresponds to one subscript or identification index, which may be a predefined subscript such as 0. In this case, the BSR can report the subscript or identification index to indicate a corresponding transmission object. It is sure that the preset identifier is not limited to a predefined identifier, and may also be configured during runtime.

In addition, in this embodiment, the BSR may also indicate corresponding target information by carrying a resource element (such as a carrier, a frequency, a resource pool, a bandwidth part BWP). For example, if the transmission object of the sidelink data to be transmitted corresponds to or is allocated with a resource element for transmitting and receiving data. In this case, the BSR can report information of the resource element to indicate a corresponding transmission object.

Alternatively, in this embodiment, different transmission methods are set for different types of data, for instance, broadcast data is transmitted through (all) beam sweeping, unicast data is transmitted through a single beam, and groupcast data is transmitted through one or more beams. In addition, different beams (for example, corresponding to different directions) may be used to transmit different unicast transmission objects, and in this case, the BSR will indicate corresponding target information by carrying beam information (such as a beam transmission mode and/or beam identification). For example, the BSR may report a beam transmission mode and/or beam identification to indicate a transmission object corresponding to it.

In addition, in this embodiment, different channels or channel groups are set for different types of data. For example, broadcast data, unicast data, and groupcast data correspond to different channels or channel groups, and different channels or channel groups may be used for different unicast transmission objects. In this case, the BSR will indicate corresponding target information by carrying channel information (such as channel ID or index, channel group ID or index). For example, the BSR may report a channel ID or index to indicate a transmission object corresponding to it.

Figure 2:
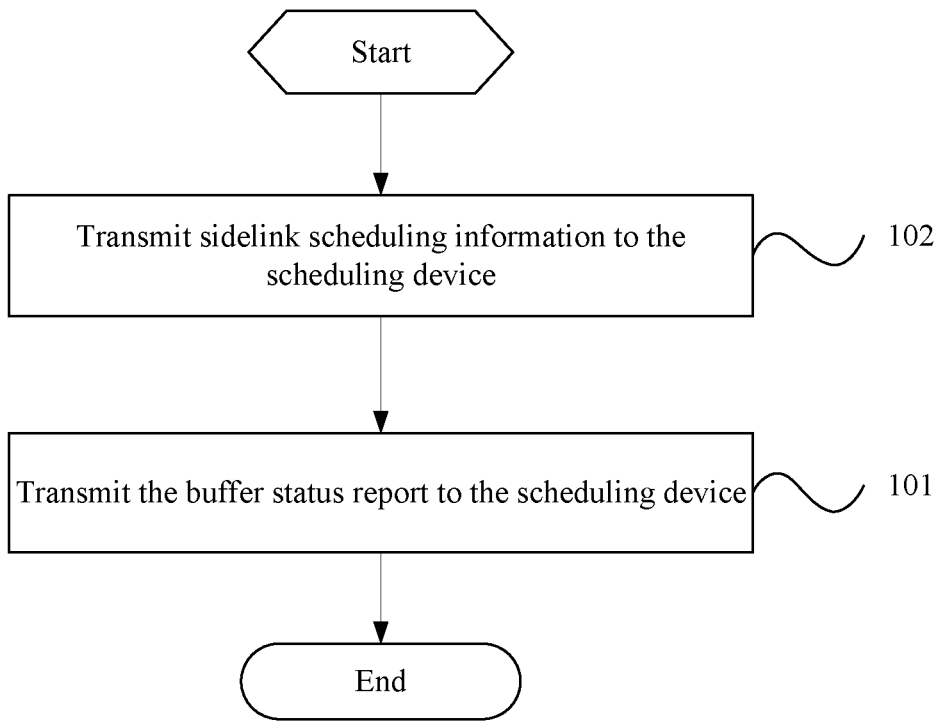
FIG. 2 is a second schematic flowchart of a buffer status report transmission method applied to a terminal according to an embodiment of the present disclosure.

However, it can be seen from the foregoing content that in the mode the buffer status report indicating target information indirectly, it is necessary to learn an association between the report content of the buffer status report and specific target information indicated to clarify the content indicated by the buffer status report. Therefore, as shown in FIG. 2, before step 101, the method further includes:

Step 102: transmit sidelink scheduling information to the scheduling device.

Optionally, the sidelink scheduling information includes at least one piece of information as follows:

maximum processing capability of the terminal:

a transmission object:

a transmission type corresponding to a transmission object:

and transmission beam information corresponding to a transmission object.

As the sidelink scheduling information herein includes at least one of maximum processing capability of the terminal, a transmission object, a transmission type corresponding to a transmission object, and transmission beam information corresponding to a transmission object, in the case of the buffer status report indicating target information indirectly, the scheduling device can clarify the specific target information indirectly indicated by the buffer status report in combination with the sidelink scheduling information after receiving the buffer status report. It is sure that a specific expression format of each information in the sidelink scheduling information corresponds to specific content indirectly indicated by the buffer status report. For example, a system sets a preset identifier corresponding to each transmission type: A1 for unicast transmission, A2 for groupcast transmission, and A3 for broadcast transmission. After a unicast connection between a current terminal and another terminal (with a terminal ID of B1) is established, the current terminal first transmits sidelink scheduling information (which includes the terminal ID of the another terminal establishing the unicast connection, and a preset identifier for unicast transmission) to a scheduling device. In this case, a buffer status report carrying the preset identifier of A1 is reported to the scheduling device, and the scheduling device can learn, in combination with the sidelink scheduling information, that the terminal transmitting the buffer status report performs unicast transmission with the terminal with the terminal ID of B1.

The maximum processing capability of the terminal itself may specifically be a beam direction or a frequency range supported by the terminal for simultaneous reception, so that the scheduling device can perform transmission configuration suitable for the capability of the terminal.

Optionally, in this embodiment, the buffer status report includes one or more formats:

The buffer status report of each format indicates the different target information, or the buffer status report of each format indicates the target information in a different way.

For example, different BSR formats are used for broadcast, groupcast, and unicast; or the BSR used for the transmission type such as broadcast directly indicates the target information, while the BSR used for the transmission type such as unicast indirectly indicates the target information.

It should further be noted that in this embodiment, the BSR may indicate one or more different transmission types at the same time, or indicate data of one or more different transmission objects at the same time, which will no longer be repeated herein.

The scheduling device performs transmission configuration according to the target information indicated by the buffer status report, which can allocate a specific resource pool or multiple time-frequency resources for the terminal reporting the BSR to transmit broadcast data or groupcast data through beam sweeping, and can also allocate at least one of a specific resource pool, a specific time-frequency resource, a beam identifier, and transmission power to instruct UE to transmit or receive unicast data or groupcast data by using a specific resource. In addition, the scheduling device will take into account the maximum processing capability of the terminal itself during configuration. A beam and/or a resource configured is not allowed to exceed the maximum processing capability of the terminal itself. For example, the scheduling device learns that the terminal only supports one receiving beam through the maximum processing capability of the terminal itself, and the scheduling device will not schedule the terminal to receive data from two directions simultaneously. The scheduling device is not limited to learning the maximum processing capability of the terminal through receiving sidelink scheduling information, but can learn it in another way.

The application of the buffer status report transmission method according to this embodiment of the present disclosure is described below in conjunction with specific embodiments:

Scenario 1: (assume that ue supports transmitting a maximum of 4 beams)
1. It is required to transmit broadcast data of UE1 on sidelink, and UE1 transmits a BSR to a base station. The BSR indicates that there is broadcast data for UE1 to transmit and indicates a size of the data to be sent.
2. The base station allocates 4 consecutive slots to UE1 according to the BSR.
3. UE1 sweeps and transmits the broadcast data in the 4 slots.

Scenario 2: (both UE1 and UE2 are in a cell of a base station and work in the scheduled resource allocation mode. UE1 has established a unicast connection with UE2.)
1. When UE1 wants to transmit data to UE2, UE1 reports a BSR to the base station. The BSR indicates a UE ID of the receiving end UE2 to which the unicast data is transmitted and a size of the data to be transmitted.
2. The base station receives the BSR and learns that UE1 wants to transmit the unicast data to UE2. In addition, the base station can also find information of UE2 (including a measurement result, and the like) according to the UE ID of UE2, and learn beam information for pairing UE1 and UE2.
a. The base station allocates a time-frequency resource for unicast to UE1, and schedules UE1 to transmit data in the resource.
b. The base station may also instruct UE1 to transmit data using a beam directed to UE2.
c. The base station may also indicate the time-frequency resource to UE2 and instruct UE2 to receive data from UE1 using a beam directed to UE1.

Scenario 3: (all UE1/2/3/4/5 are in a cell of a base station and work in the scheduled resource allocation mode. UE1/2/3/4/5 report beam measurement results and pairing information between them to the base station. UE1 has established a unicast connection with UE2, and UE1 has established a groupcast connection with UE3 and UE4. UE1 has set up HARQ entity h1 for unicast connection with UE2, and has set up HARQ entity h2 for groupcast transmission with UE3 and UE4.)
1. UE1 reports an ID of UE2 and h1, and groupcast of UE3/4 and h2 to the base station.
2. When UE1 wants to transmit data to UE2, UE1 reports a BSR to the base station, which indicates h1 and a size of the data to be transmitted.
3. After receiving the BSR, the base station learns, according to indication of h1, that UE1 wants to transmit the unicast data to UE2. In addition, the base station can also find information of UE2 (including a measurement result, and the like) according to the UE ID of UE2 corresponding to h1, and learn beam information for pairing UE1 and UE2.
a. The base station allocates a time-frequency resource for unicast to UE1, and schedules UE1 to transmit data in the resource.
b. The base station may also instruct UE1 to transmit data using a beam directed to UE2.
c. The base station may also indicate the time-frequency resource to UE2 and instruct UE2 to receive data from UE1 using a beam directed to UE1.
4. Similarly, when UE1 wants to transmit groupcast data, UE1 reports a BSR to the base station, which indicates h2 and a size of the data to be transmitted.
5. After receiving the BSR, the base station learns, according to indication of h2, that UE1 wants to transmit the groupcast data. In addition, the base station can also find information of UE2 (including a measurement result, and the like) according to the UE IDs of UE3/4 corresponding to h2, and learn beam information for pairing UE1 and UE3/4.
a. The base station allocates one or more time-frequency resources for groupcast to UE1, and schedules UE1 to transmit data in the resource.
b. The base station may also instruct UE1 to transmit data using a beam directed to UE3 and UE4.
c. The base station may also indicate the time-frequency resource to UE3 and UE4 and instruct them to receive data from UE1 using a beam directed to UE1.

Figure 7:
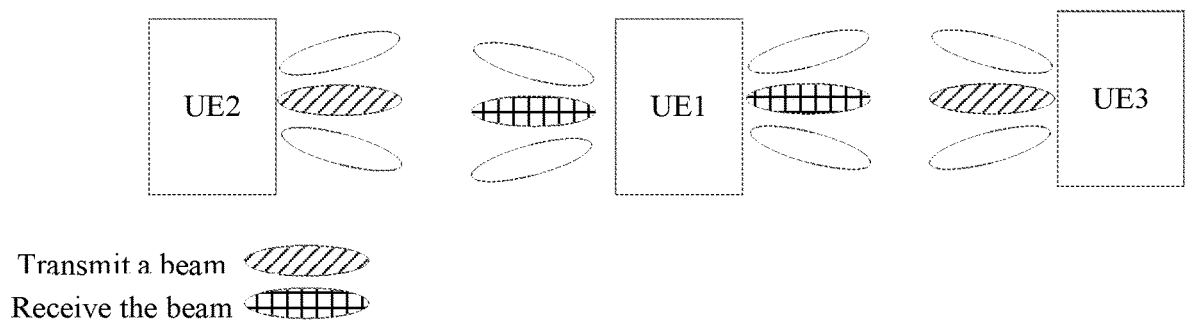
FIG. 7 is a schematic diagram of scenario four.

Scenario 4: (as shown in FIG. 7, all UE1/2/3 are in a cell of a base station and work in the scheduled resource allocation mode. UE1 has established a unicast connection with UE2 and UE3)
1. UE1 reports to the base station that it supports only one receiving beam.
2. When UE2 and UE3 want to transmit data to UE1, UE2 and UE3 report a BSR to the base station, which indicates a UE ID of the receiving end UE1 to which the unicast data is transmitted and a size of the data to be transmitted.

3. After receiving the BSRs from UE2 and UE3, the base station learns that UE2 and UE3 want to transmit the unicast data to UE1. In addition, the base station can also learn beam information for pairing UE1 with UE2 and UE3 according to the content of the BSR. The base station allocates a time-frequency resource for unicast to UE2 and UE3, and schedules UE2 and UE3 to transmit data by using a beam directed to UE1. However, the base station ensures that UE2 and UE3 will not transmit data to UE1 simultaneously, so that UE1 can use a single receiving beam to receive different data from both UE2 and UE3.

In summary, in the buffer status report transmission method according to the embodiment of the present disclosure, a terminal can transmit a buffer status report to a scheduling device, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can complete sidelink data transmission configuration for the terminal in a more effective way.

Figure 3:
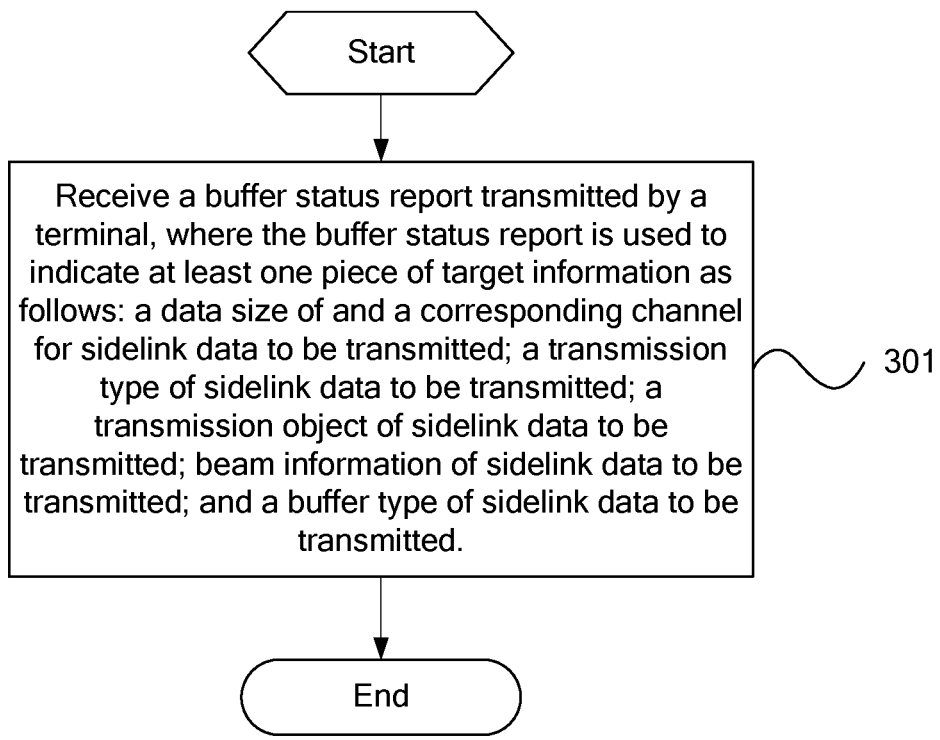
FIG. 3 is a schematic flowchart of a buffer status report transmission method applied to a scheduling device according to an embodiment of the present disclosure.

As shown in FIG. 3, a buffer status report transmission method according to an embodiment of the present disclosure, which is applied to a scheduling device, includes:

Step 301. receive a buffer status report sent by a terminal, where the buffer status report is used to indicate at least one piece of target information as follows:

a data size of and a corresponding channel for sidelink data to be transmitted:

a transmission type of sidelink data to be transmitted:

a transmission object of sidelink data to be transmitted:

beam information of sidelink data to be transmitted:

and a buffer type of sidelink data to be transmitted:

Through the foregoing steps, a terminal can transmit a buffer status report to a scheduling device, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can complete sidelink data transmission configuration for the terminal in a more effective way.

Optionally, the buffer status report indicates the target information directly or indirectly.

Optionally, indicating the target information indirectly by the buffer status report includes:

indicating the target information based on an association relationship with a hybrid automatic repeat request HARQ entity: or indicating the target information based on an association relationship with a preset identifier: or indicating the target information based on an association relationship with a resource element: or indicating the target information based on an association relationship with a beam; or indicating the target information based on an association relationship with a channel.

Optionally, before the receiving a buffer status report sent by a terminal, the method further includes:

Receiving sidelink scheduling information sent by the scheduling device.

Optionally, the sidelink scheduling information includes at least one piece of information as follows:

maximum processing capability of the terminal:

a transmission object:

a transmission type corresponding to a transmission object:

and transmission beam information corresponding to a transmission object.

Optionally, the buffer status report includes one or more formats:

The buffer status report of each format indicates the different target information, or the buffer status report of each format indicates the target information in a different way.

Optionally, after the receiving the buffer status report sent by the terminal, the method further includes:

transmitting transmission configuration information corresponding to the buffer status report to the terminal: where the transmission configuration information is used to: instruct the terminal to transmit broadcast data or groupcast data through beam sweeping: or instruct the terminal to transmit or receive unicast data or groupcast data through a configured resource.

Optionally, a beam and/or a resource configured in the transmission configuration information is not allowed to exceed the maximum processing capability of the terminal itself.

In this embodiment, the scheduling device performs corresponding transmission configuration according to the target information indicated by the buffer status report, which can allocate a specific resource pool or multiple time-frequency resources for the terminal reporting the BSR to transmit broadcast data or groupcast data through beam sweeping, and can also allocate at least one of a specific resource pool, a specific time-frequency resource, a beam identifier, and transmission power to instruct UE to transmit or receive unicast data or groupcast data by using a specific resource. In addition, the scheduling device will take into account the maximum processing capability of the terminal itself during configuration. A beam and/or a resource configured is not allowed to exceed the maximum processing capability of the terminal itself. For example, the scheduling device learns that the terminal only supports one receiving beam through the maximum processing capability of the terminal itself, and the scheduling device will not schedule the terminal to receive data from two directions simultaneously. The scheduling device is not limited to learning the maximum processing capability of the terminal through receiving sidelink scheduling information, but can learn it in another way.

It should be noted that this method is used in combination with the foregoing buffer status report transmission method applied to a terminal, to realize effective sidelink data transmission configuration. The implementation manner of the embodiment of the foregoing buffer status report transmission method applied to a terminal is applicable to this method, with the same technical effect achieved.

Figure 4:
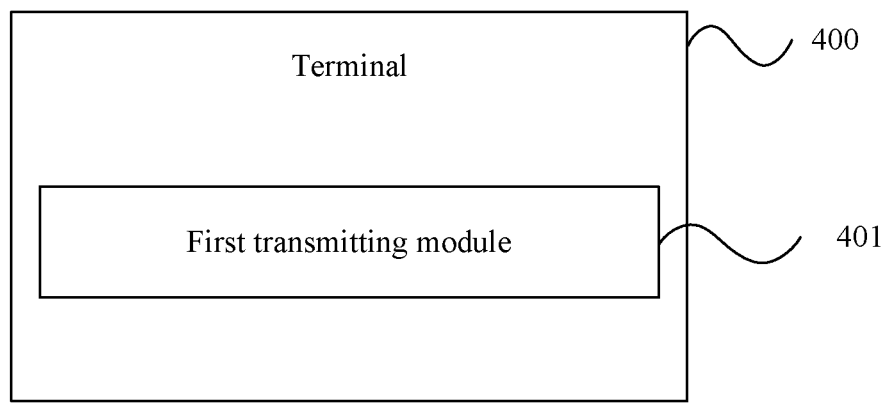
FIG. 4 is a schematic structural diagram of a terminal according to an embodiment of the present disclosure.

FIG. 4 is a block diagram of a terminal according to an embodiment of the present disclosure. The terminal 400 as shown in FIG. 4 includes a first transmitting module 401.

Figure 5:
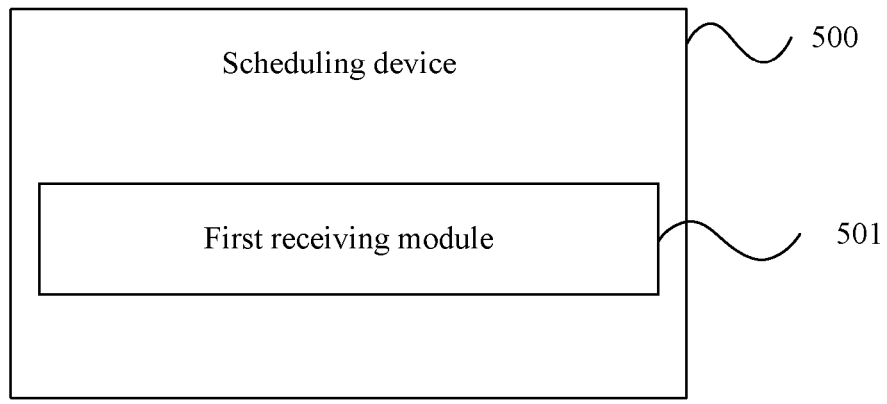
FIG. 5 is a schematic structural diagram of a scheduling device according to an embodiment of the present disclosure.

The first transmitting module 401 is configured to transmit a buffer status report to a scheduling device, where the buffer status report is used to indicate at least one piece of target information as follows:
a data size of and a corresponding channel for sidelink data to be transmitted:
a transmission type of sidelink data to be transmitted:
a transmission object of sidelink data to be transmitted:
beam information of sidelink data to be transmitted:
and a buffer type of sidelink data to be transmitted:
Optionally, the buffer status report indicates the target information directly or indirectly.
Optionally, indicating the target information indirectly by the buffer status report includes:
indicating the target information based on an association relationship with a hybrid automatic repeat request HARQ entity: or
indicating the target information based on an association relationship with a preset identifier: or
indicating the target information based on an association relationship with a resource element: or
indicating the target information based on an association relationship with a beam; or
indicating the target information based on an association relationship with a channel.
Optionally, the terminal further includes:
a second transmitting module, configured to transmit sidelink scheduling information to the scheduling device.
Optionally, the sidelink scheduling information includes at least one piece of information as follows:
maximum processing capability of the terminal:
a transmission object:
a transmission type corresponding to a transmission object;
and transmission beam information corresponding to a transmission object.
Optionally, the buffer status report includes one or more formats;
The buffer status report of each format indicates the different target information, or the buffer status report of each format indicates the target information in a different way.
Optionally, the first transmitting module is further configured to:
transmit the buffer status report to the scheduling device in the case that there is sidelink data to be transmitted.
The terminal 400 can implement the processes implemented by the terminal in the method embodiments of FIG. 1 to FIG. 2. To avoid repetition, details are not described herein again. A terminal according to the embodiment of the present disclosure can transmit a buffer status report to a scheduling device, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can complete sidelink data transmission configuration for the terminal in a more effective way.
FIG. 5 is a block diagram of a scheduling device according to an embodiment of the present disclosure. The scheduling device 500 as shown in FIG. 5 includes a first receiving module 501.
The first receiving module 501 is configured to receive a buffer status report sent by a terminal, where the buffer status report is used to indicate at least one piece of target information as follows:
a data size of and a corresponding channel for sidelink data to be transmitted;
a transmission type of sidelink data to be transmitted;
a transmission object of sidelink data to be transmitted;
beam information of sidelink data to be transmitted;
and a buffer type of sidelink data to be transmitted;
Optionally, the buffer status report indicates the target information directly or indirectly.
Optionally, indicating the target information indirectly by the buffer status report includes:
indicating the target information based on an association relationship with a hybrid automatic repeat request HARQ entity: or
indicating the target information based on an association relationship with a preset identifier; or
indicating the target information based on an association relationship with a resource element: or
indicating the target information based on an association relationship with a beam; or
indicating the target information based on an association relationship with a channel.
Optionally, the scheduling device 500 further includes:
a second receiving module, configured to receive sidelink scheduling information sent by the scheduling device.
Optionally, the sidelink scheduling information includes at least one piece of information as follows:
maximum processing capability of the terminal:
a transmission object:
a transmission type corresponding to a transmission object;
and transmission beam information corresponding to a transmission object.
Optionally, the buffer status report includes one or more formats:
The buffer status report of each format indicates the different target information, or the buffer status report of each format indicates the target information in a different way.
Optionally, the scheduling device 500 further includes:
a third transmitting module, configured to transmit transmission configuration information corresponding to the buffer status report to the terminal, where
the transmission configuration information is used to: instruct the terminal to transmit broadcast data or groupcast data through beam sweeping: or instruct the terminal to transmit or receive unicast data or groupcast data through a configured resource.
A beam and/or a resource configured in the transmission configuration information is not allowed to exceed the maximum processing capability of the terminal itself.
The scheduling device 500 can implement the processes implemented by the scheduling device in the method embodiment in FIG. 3. To avoid repetition, details are not described herein again. A scheduling device according to the embodiment of the present disclosure receives a buffer status report transmitted by a terminal, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can complete sidelink data transmission configuration for the terminal in a more effective way.

Figure 6:
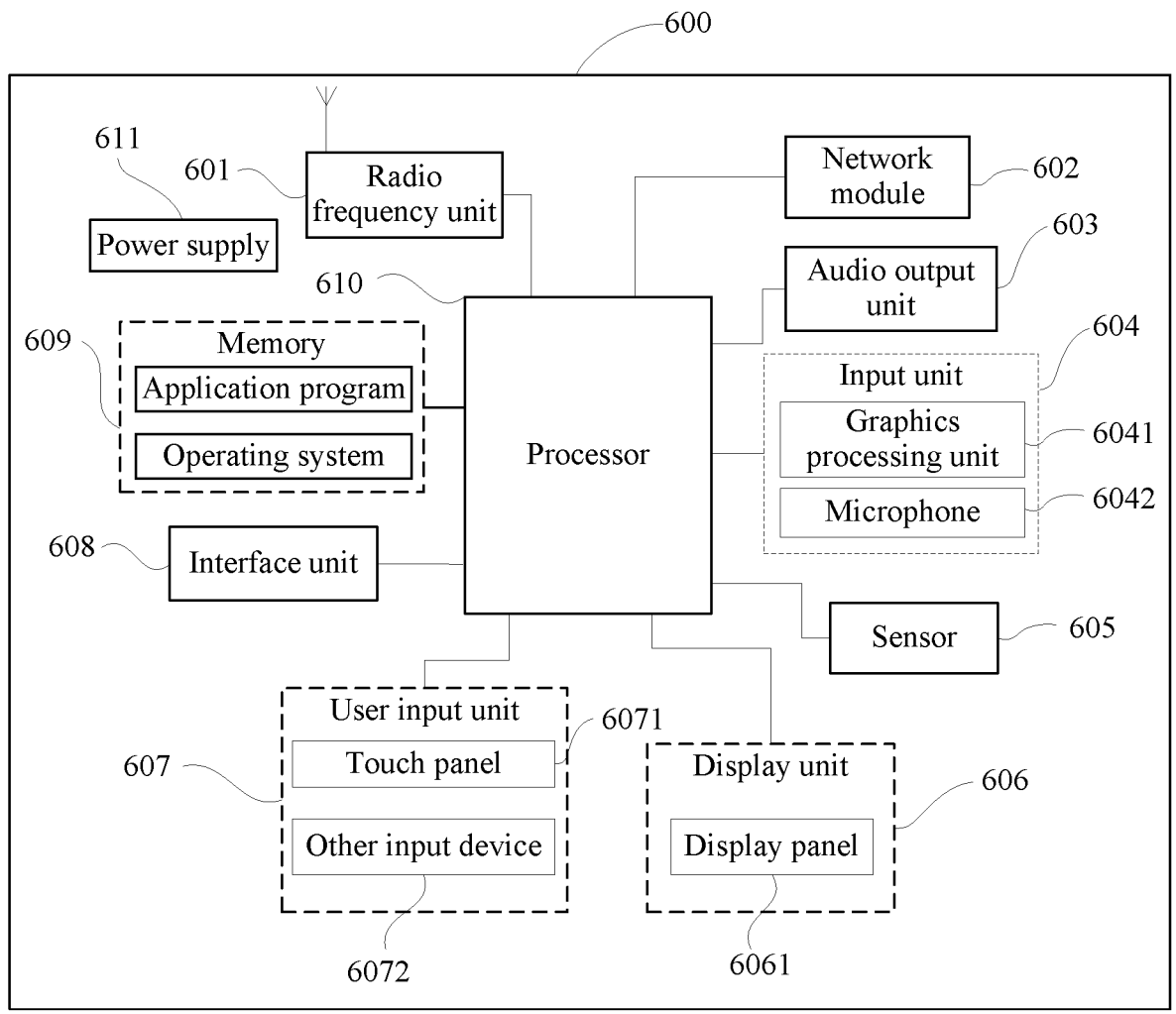
FIG. 6 is a schematic structural diagram of a terminal according to another embodiment of this disclosure.

FIG. 6 is a schematic structural diagram of hardware of a terminal implementing embodiments of the present disclosure. The terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. A person skilled in the art may understand that the structure of the terminal shown in FIG. 6 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 601 is configured to transmit a buffer status report to a scheduling device, where the buffer status report is used to indicate at least one piece of target information as follows:
  a data size of and a corresponding channel for sidelink data to be transmitted:
  a transmission type of sidelink data to be transmitted:
  a transmission object of sidelink data to be transmitted:
  beam information of sidelink data to be transmitted:
  and a buffer type of sidelink data to be transmitted:

It can be seen that the terminal can transmit a buffer status report to the scheduling device, and the buffer status report can be used to indicate at least one piece of information as follows: a data size of and a corresponding channel for sidelink data to be transmitted: a transmission type of sidelink data to be transmitted: a transmission object of sidelink data to be transmitted: beam information of sidelink data to be transmitted; and a buffer type of sidelink data to be transmitted, so that the scheduling device can learn about information related to sidelink data transmission of the terminal, and can complete sidelink data transmission configuration for the terminal in a more effective way.

It should be understood that, in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides a user with wireless broadband Internet access through the network module 602, for example, helps the user transmit and receive emails, browse web pages, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive audio or radio frequency signals. The input unit 604 may include a graphics processing unit (Graphics Processing Unit, GPU) 6041 and a microphone 6042. The graphics processing unit 6041 processes image data of a static image or a video obtained by an image capturing apparatus (such as, a camera) in a video capturing mode or an image capturing mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 may receive sound and can process such sound into audio data. The processed audio data may be converted, in a call mode, into a format that can be sent by the radio frequency unit 601 to a mobile communication base station for output.

The terminal 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as switching between a landscape mode and a portrait mode, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include a display panel 6061, and the display panel 6061 may be configured in a form of liquid crystal display (Liquid Crystal Display, LCD), organic light-emitting diode (Organic Light-emitting Diode, OLED), or the like.

The user input unit 607 can be configured to receive input numeric or character information, and generate key signal inputs related to user settings and function control of the terminal. Specifically, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, and receives and executes a command sent by the processor 610. In addition, the touch panel 6071 can be implemented in various types such as resistive, capacitive, infrared, and surface acoustic waves. In addition to the touch panel 6071, the user input unit 607 may further include the another input device 6072. Specifically, the another input device 6072 may include but is not limited to a physical keyboard, function keys (such as a volume control key and a switch key), a trackball, a mouse, and a joystick. Details are not described herein.

Further, the touch panel 6071 can cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. In FIG. 6, the touch panel 6071 and the display panel 6061 are used as two independent components to implement input and output functions of the terminal. However, in some embodiments, the touch panel 6071 and the display panel 6061 may be integrated to implement the input and output functions of the terminal. This is not specifically limited herein.

The interface unit 608 is an interface connecting an external apparatus to the terminal 600. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 608 can be configured to receive an input (for example, data information and power) from the external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image play back function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor and a modem processor. The application processor mainly deals with an operating system, a user interface, an application program, and the like. The modem processor mainly deals with wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some functional modules not shown. Details are not described herein again.

Optionally, an embodiment of the present disclosure further provides a terminal, including a processor, a memory, a computer program stored in the memory and executable on the processor. When the computer program is executed by the processor, the processes of the foregoing embodiment of the buffer status report transmission method applied to a terminal are implemented, with the same technical effect achieved. To avoid repetition, details are not described herein again.

Optionally, an embodiment of the present disclosure further provides a scheduling device, including a processor, a memory, and a computer program stored in the memory and executable on the processor. When the computer program is executed by the processor, the processes of the foregoing embodiment of the buffer status report transmission method applied to a scheduling device are implemented, with the same technical effects achieved. To avoid repetition, details are not described herein again.

An embodiment of the present disclosure further provides a computer readable storage medium in which a computer program is stored. When the computer program is executed by a processor, the processes of the foregoing embodiment of the buffer status report transmission method applied to a terminal are implemented, with the same technical effects achieved. To avoid repetition, details are not described herein again.

An embodiment of the present disclosure further provides a computer readable storage medium in which a computer program is stored. When the computer program is executed by a processor, the processes of the foregoing embodiment of the buffer status report transmission method applied to a scheduling device are implemented, with the same technical effects achieved. To avoid repetition, details are not described herein again.

The computer readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A buffer status report transmission method performed by a terminal, comprising:
    transmitting sidelink scheduling information to a scheduling device, wherein the sidelink scheduling information comprises a transmission object comprising unicast User Equipment (UE) Identity (ID) or groupcast group ID;
    transmitting a buffer status report to the scheduling device, wherein the buffer status report is used to indirectly indicate target information as follows:
    a transmission type of sidelink data to be transmitted,
    wherein the buffer status report comprises a preset identifier, wherein the preset identifier corresponds to the transmission type of sidelink data to be transmitted between the terminal and the transmission object, wherein the transmission type comprises unicast transmission, groupcast transmission, or broadcast transmission,
    wherein the buffer status report comprises one or more formats, and
    the buffer status report of each format indicates different target information, or the buffer status report of each format indicates the target information in a different way.

2. The buffer status report transmission method according to claim 1, wherein the target information further comprises:
    a transmission object of side link data to be transmitted;
    beam information of side link data to be transmitted;
    a buffer type of sidelink data to be transmitted; or
    a data size of and a corresponding channel for side link data to be transmitted.

3. The buffer status report transmission method according to claim 2, wherein the buffer status report indicates the target information indirectly by:
    indicating the target information based on an association relationship with a hybrid automatic repeat request HARQ entity; or
    indicating the target information based on an association relationship with a resource element; or
    indicating the target information based on an association relationship with a beam; or
    indicating the target information based on an association relationship with a channel.

4. The buffer status report transmission method according to claim 1, wherein the sidelink scheduling information further comprises:
    maximum processing capability of the terminal;
    a transmission type corresponding to the transmission object; or
    transmission beam information corresponding to the transmission object.

5. The buffer status report transmission method according to claim 1, wherein the transmitting a buffer status report to a scheduling device comprises:
    transmitting the buffer status report to the scheduling device in the case that there is side link data to be transmitted.

6. A terminal, comprising a processor, a memory, and a computer program stored in the memory and executable on the processor, wherein when the computer program is executed by the processor, a buffer status report transmission method comprising:
    transmitting sidelink scheduling information to a scheduling device, wherein the sidelink scheduling information comprises a transmission object comprising unicast User Equipment (UE) Identity (ID) or groupcast group ID;
    transmitting a buffer status report to the scheduling device, wherein the buffer status report is used to indirectly indicate target information as follows:
    a transmission type of side link data to be transmitted,
    wherein the buffer status report comprises a preset identifier, wherein the preset identifier corresponds to the transmission type of sidelink data to be transmitted between the terminal and the transmission object, wherein the transmission type comprises unicast transmission, groupcast transmission, or broadcast transmission,
    wherein the buffer status report comprises one or more formats, and
    the buffer status report of each format indicates the different target information, or the buffer status report of each format indicates the target information in a different way.

7. The terminal according to claim 6, wherein the target information further comprises:
    a transmission object of side link data to be transmitted;
    beam information of side link data to be transmitted;
    a buffer type of sidelink data to be transmitted; or
    a data size of and a corresponding channel for sidelink data to be transmitted.

8. The terminal according to claim 7, wherein the buffer status report indicates the target information indirectly by:
    indicating the target information based on an association relationship with a hybrid automatic repeat request HARQ entity; or
    indicating the target information based on an association relationship with a resource element; or
    indicating the target information based on an association relationship with a beam; or
    indicating the target information based on an association relationship with a channel.

9. The terminal according to claim 6, wherein the sidelink scheduling information further comprises:
    maximum processing capability of the terminal;
    a transmission type corresponding to a transmission object; or
    transmission beam information corresponding to a transmission object.

10. The terminal according to claim 6, wherein the transmitting a buffer status report to a scheduling device comprises:
    transmitting the buffer status report to the scheduling device in the case that there is side link data to be transmitted.

11. A scheduling device, comprising a processor, a memory, and a computer program stored in the memory and executable on the processor, wherein when the computer program is executed by the processor, a buffer status report receiving method comprising:
    receiving sidelink scheduling information from a terminal, wherein the sidelink scheduling information comprises a transmission object comprising unicast User Equipment (UE) Identity (ID) or groupcast group ID;

receiving a buffer status report sent by the terminal, wherein the buffer status report is used to indirectly indicate target information as follows:
a transmission type of side link data to be transmitted; and
determining the target information on its own based on at least on the buffer status report, wherein the buffer status report comprises a preset identifier, wherein the preset identifier corresponds to the transmission type of sidelink data to be transmitted between the terminal and the transmission object, wherein the transmission type comprises unicast transmission, groupcast transmission, or broadcast transmission,
wherein the scheduling device determines the transmission type of sidelink data to be transmitted between the terminal and the transmission object based on the buffer status report and the sidelink scheduling information,
wherein the buffer status report comprises one or more formats, and
the buffer status report of each format indicates different target information, or the buffer status report of each format indicates the target information in a different way.

12. The scheduling device according to claim 11, wherein the target information further comprises:
a transmission object of side link data to be transmitted;
beam information of side link data to be transmitted;
a buffer type of sidelink data to be transmitted; or
a data size of and a corresponding channel for side link data to be transmitted.

13. The scheduling device according to claim 12, wherein the buffer status report indicates the target information indirectly by:
indicating the target information based on an association relationship with a hybrid automatic repeat request HARQ entity; or
indicating the target information based on an association relationship with a resource element; or
indicating the target information based on an association relationship with a beam; or
indicating the target information based on an association relationship with a channel.

14. The scheduling device according to claim 11, wherein the sidelink scheduling information further comprises:
maximum processing capability of the terminal;
a transmission type corresponding to a transmission object; or
transmission beam information corresponding to a transmission object.

15. A non-transitory computer readable storage medium, wherein the computer readable storage medium stores a computer program, and when the computer program is executed by a processor, the step of the buffer status report transmission method according to claim 1 is performed.

* * * * *